United States Patent [19]

Fussell

[11] Patent Number: 4,597,633

[45] Date of Patent: Jul. 1, 1986

[54] IMAGE RECEPTION SYSTEM

[76] Inventor: Charles H. Fussell, 3927 Rosser Sq., Dallas, Tex. 75244

[21] Appl. No.: 697,516

[22] Filed: Feb. 1, 1985

[51] Int. Cl.$^4$ ............................................. G03B 21/56
[52] U.S. Cl. ....................................... 350/125; 40/212; 352/69; 353/13
[58] Field of Search ................... 350/125; 40/212–215; 353/67, 74, 79, 119, 13; 352/69; 244/24, 31

[56] References Cited

U.S. PATENT DOCUMENTS

| | | | |
|---|---|---|---|
| 2,592,444 | 4/1952 | Matelena | 40/214 X |
| 3,720,455 | 3/1973 | Sahlin | 350/117 |
| 4,022,522 | 5/1977 | Rain | 350/117 |
| 4,323,301 | 4/1982 | Spector | 350/117 |

*Primary Examiner*—Richard A. Wintercorn
*Attorney, Agent, or Firm*—Richards, Harris, Medlock & Andrews

[57] ABSTRACT

An image reception system is provided with an inflatable viewing surface. A video projection system is arranged within the volume defining the viewing surface to form images on interior concave surfaces. The projected image is viewed on the outside convex surface. The concave image reception surfaces permit large area projection surfaces with a projection system having a short focal length.

5 Claims, 3 Drawing Figures

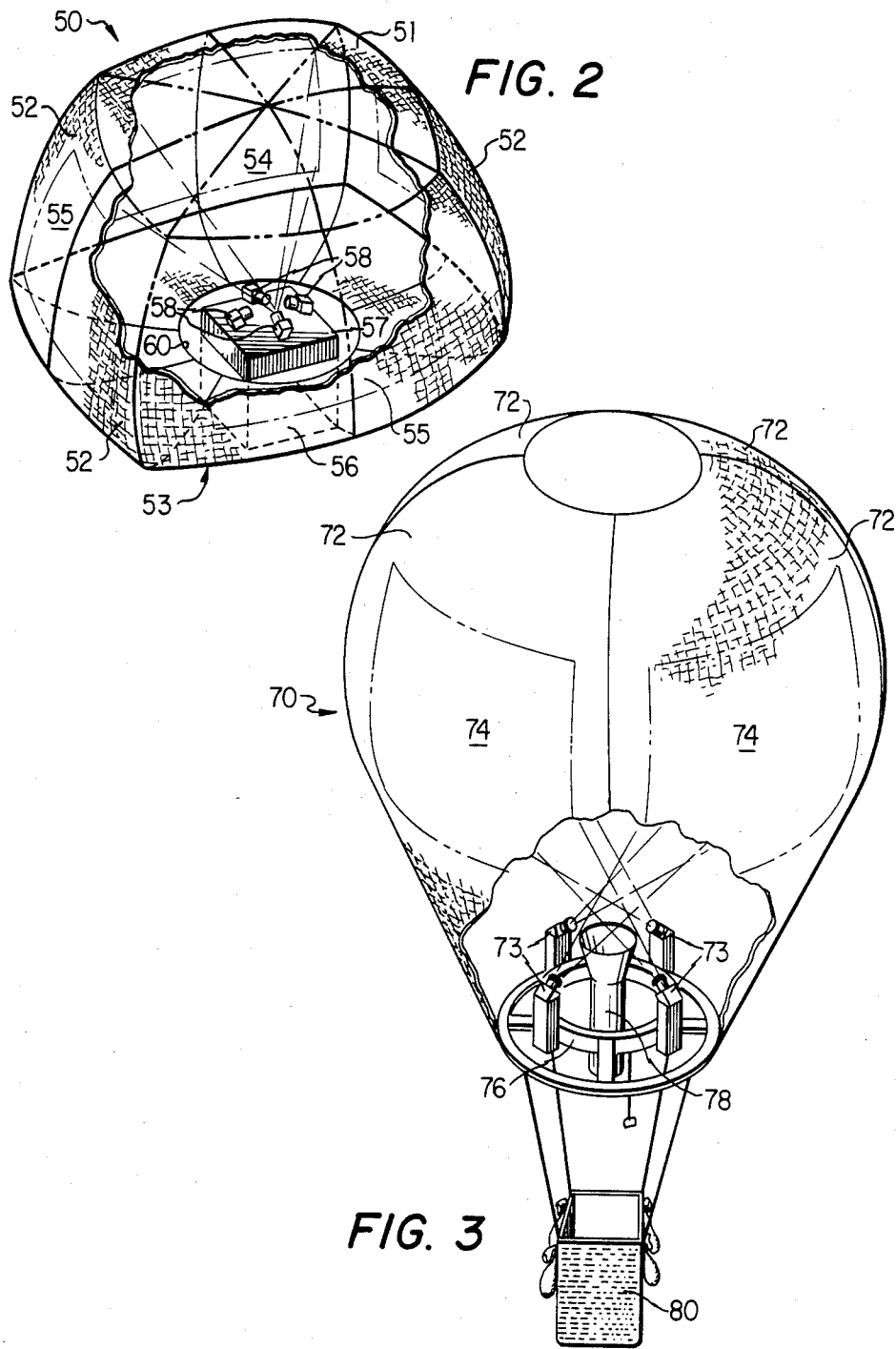

IMAGE RECEPTION SYSTEM

TECHNICAL FIELD

This invention relates to video projection screens and more particularly to inflatable portable video reception screens having a plurality of reception screens for circumferential viewing.

BACKGROUND ART

Video reception systems have been available in various forms for many years. However, the available systems generally include stationary, rigid screens on which the video picture is projected. As used herein, "video" includes cinema, slide projection, television, laser or any other means of transforming a visual image to a light pattern for remote projection toward a viewing surface.

Further, conventional projection screens are flat. A typical projector lens forms a distorted image on a flat screen since a projected pattern is normally spherical in shape. In order to minimize distortion, the camera lens and the projector lenses may be designed to operate together to produce a planar pattern at preselected projection parameters.

The distance from the projector lens to the surface of the screen is relative to the desired image size on the reception surface at a given angle of divergence for light rays emerging from the projector lens. The angle of divergence is inversely proportional to the focal length of the projector lenses. The shorter the distance from the projector lenses to the screen for a given size of the image to be displayed on the screen, the shorter the required focal length for the projector and the greater the spherical aberration and lens distortion for a flat projection surface.

In order to produce a large image on a flat screen with a relatively small distortion, a projector lens having a long focal length must be selected and placed at a distance from the screen sufficient to maintain the spherical aberration (distortion produced by projecting a spherical wave front onto a planar surface) within acceptable limits.

If a compact system is desired, the projection screen must be provided with a concave surface to be compatible with relatively short focal lengths. A concave screen tends to equalize the projection paths from various portions of the lens surface to minimize aberration. It will be appreciated that the greater the screen concavity, the smaller the included angle within which the screen can be viewed by an observer within the concavity.

It is apparent that present video reception systems have substantial distortions unless significant alterations are made to the projection lenses and projection screen. Such alterations have the effect of confining the adaptability and usefulness of any one system to a single coordinated application and assembly.

Yet other problems arise when attempting to project video images for 360°, or full circle, presentation. Flat screens leave substantial sector areas about adjoining screens where the picture is not visible. Conventional projection systems are unable to project onto convex surfaces which join to provide a circular surface. In addition, conventional video reception screens with arcuate surfaces are simply not portable.

These and other problems of the prior art are overcome by the present invention which provides an arcuate concave image reception surface and convex image viewing surfaces by projecting internally onto an inflated surface.

SUMMARY OF THE INVENTION

An image reception system is provided with an inflatable image reception screen formed by a first plurality of arcuate panels of flexible material defining a substantially closed volume. A second plurality of arcuate panels of said first plurality of panels have an inflated interior surface contour and orientation for receiving a projected image. The material selected for at least the second plurality of panels transmits the received interior image for external viewing. A projection system is provided within the inflated volume for projecting selected images onto the interior surface.

In one embodiment, the projection screen is inflated using a heated gas. Air may be heated by removing heat generated by incandescent projection lamps, if used, or gas may be burned, as in a hot air balloon.

In yet other embodiments, the image is projected directly onto the interior surface of the volume or is projected vertically through a lens system for reflection onto the surface.

In one other embodiment, a base is provided within which the projectors and the material forming the inflatable volume may be retracted for storage and transportation.

These and other features of the present invention will become apparent from the following detailed description, wherein reference is made to the figures in the accompanying drawings.

BRIEF DESCRIPTION OF THE DRAWINGS

FIG. 2 is a pictorial illustration of one embodiment of the present invention using an ovaloid projection surface.

FIG. 3 is a pictorial illustration of an adaptation of one embodiment of the present invention to a balloon.

DETAILED DESCRIPTION

Figure 1:
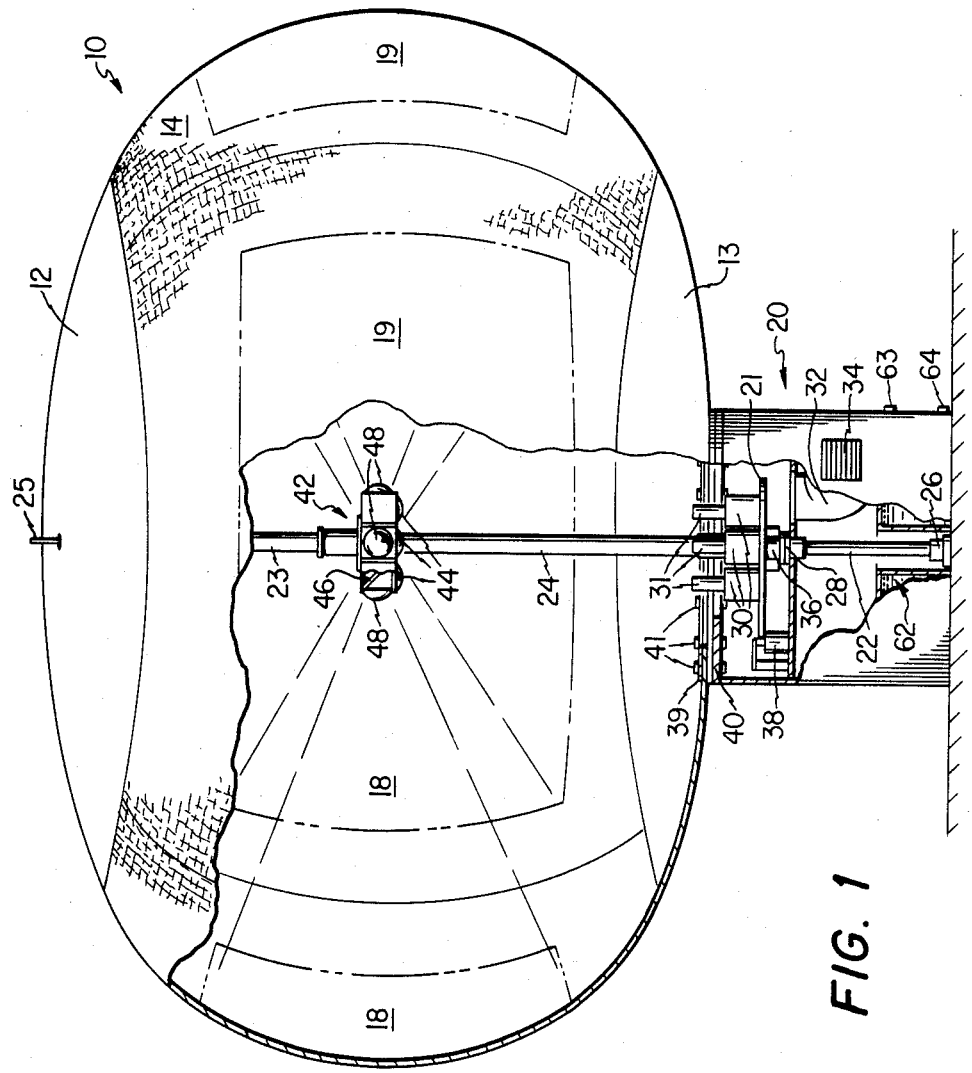
FIG. 1 is a pictorial illustration in partial cut-away cross-section of one embodiment of the present invention using a spherical projection surface.

Referring now to FIG. 1, there is shown a pictorial illustration in partial cut-away cross-section of one embodiment of the present invention having a spheroidal expandable volume 10. As used herein, spheroid means a body that is substantially spherical but having some departures from spherical. Spheroid 10 is mounted to base unit 20 which may contain image projection equipment, inflation equipment and/or spheroid support and storage equipment.

As shown in FIG. 1, spheroid 10 is formed from a plurality of arcuate panels 12, 13, 14. A preferred material forming arcuate panels 12, 13, 14 enables an image projected on the interior surface to be viewed on the external surface of spheroid 10, i.e., the material is translucent. Further, the material is preferably somewhat resilient to extend under a slight internal pressure to form a smooth external surface. In one embodiment, the material selected for spheroid 10 may have a weave which permits the gradual release of heated air from within spheroid 10. A woven material formed of 100% polyester has been found to be a suitable fabric for the material which forms spheroid 10.

The image projection system shown in FIG. 1 may be portable and may be erected at a selected side by raising an internal support 23, engaging pin 25 in top arcuate panel 12. Base unit 20 may then exhaust a heated gas to the interior of spheroid 10 causing arcuate panels 12, 13, 14 to expand as a pressure differential develops across arcuate panels 12, 13, 14.

Arcuate panels 14 generally define a vertical spheroidal periphery about spheroid 10 to comprise the concave image reception and convex viewing surface. Interior arcuate surfaces 18 form the projection surfaces of arcuate panels 14. Projection areas or reception surfaces 18 receive the images projected by the internal projection system 30, 31, 42. Thus, an image is projected toward the interior of arcuate panels 14 and received by projection areas 18. Projection areas 18 are translucent for viewing the received image on external viewing surfaces 19 where a full 360° of viewing area is available. The external viewing area may be used to form a continuous image or the same image may be provided on adjacent projection areas 18.

Base unit 20 is provided to enclose and support columns 22, 24 for maintaining spheroid 10 in a stable upright position. Extension column 23 engages pin 25 with upper arcuate panel 12 and may extend through column 24 from base unit 20. Column 24 conveniently supports projector heads 42, as hereinafter described, and may rotate about extension column 23, if desired. In one embodiment, extension column 23 and column 24 retract into base 20 for storage and shipment. Extension and support columns 22, 23, 24 may be mounted on support base 26 and rotatable column 24 may be mounted to blocking plate and bearing assembly 28 where rotation is desired.

Base 20 further provides base plate 21 to support video projectors 30 for projecting an image through lens assemblies 31 toward projector heads 42. Video projectors 30 are cooled by blower unit 32 for directing outside air through vent 34 and projectors 30 and within spheroid 10. Heat generated by projectors 30 warms the air which may assist to buoy and distend spheroid 10 in an inflated position.

Where rotation of projector heads 48 is desired, geared motor assembly 38 may be provided in base 20 to power the rotation. Power then may be conveniently supplied to projectors 30 by brush-type commutator 36 as the assembly rotates.

Portability of the unit shown in FIG. 1 may be enhanced by providing water tank 62 in the bottom of base 20. Fill plug 63 and drain plug 64 permit easy assembly and disassembly to stabilize erected spheroid 10 at a selected viewing site.

Spheroid 10 is secured to base 20 between flange 40 and mounting ring 39. Upper and lower arcuate surfaces 12, 13 preferably include double material thicknesses for enhanced strength adjacent mounting and support locations. Bottom arcuate surface 13 is clamped between surfaces 39 and 40 with fastening means 41. If needed, flexible gaskets (not shown) may be included between mating parts to assure cooling air flow through the projectors.

The image projected by each video projector 30 through lens 31 is directed to a projector head 42, where each projector head 42 is aligned with a corresponding lens assembly 31. Projector heads 42 may include a variety of optical devices for shaping the projection plane for the image. As shown in FIG. 1, input lenses 44 are provided to direct the image onto mirrored surfaces 46 which are angled to reflect the image toward interior reception surfaces 18. Output lenses 48 may assist in defining the final projected image contour for reception by spheroid 10. Projectors 30, lens assembly 31, projector head lenses 44, 48 and angled mirror 46 are conveniently formed of conventional commercial components. If desired, lens assemblies 31, 44, 48 may be further tailored to project an image more conformed to the actual shape of spheroid 10 using conventional optical design procedures.

Thus, a highly versatile image reception system is provided using the inflatable spheroid 10 with an interior projection system. A viewing audience may surround the entire outside surface to view a wide angle projection or several smaller angle projections of the same image, although different images may be projected on different surfaces, if desired. Interior arcuate reception surfaces 18 more closely approximate the shape of the wave front formed by conventional projection equipment. Thus, spherical aberration of the projected image is minimized with substantially fewer optical design problems. Video projectors 30 may be conventional cinema projectors, may be a television projection system or may include lasers for projecting onto projection areas 18.

Referring now to FIG. 2, there is depicted an alternate embodiment for an image reception system where the image is received directly from the video projection system. An ovaloid volume 50 is provided which is inflatable as hereinabove discussed for spheroid 10 (FIG. 1). As used herein, ovaloid means a body which is comprised of connected arcuate surfaces generally enclosing an egg shaped or ellipsoidal volume rather than a spherical volume. Ovaloid 50 is comprised of a plurality of arcuate panels 51, 52, 53 which form the enclosed volume for inflation and mating with base unit 56. Ovaloid 50 may include a central support mast and structure as shown in FIG. 1, although there is no need to support elevated projector heads or lens assemblies.

A plurality of projectors 58 are shown supported on plate 57 of base 56. The support surface for projectors 58 can be rotatable, if desired, and base 56 can be configured to store projectors 58 within base 56 for projection when the image reception system is not in use.

As shown in FIG. 2, projector 58 is directed toward a corresponding side arcuate panel 52. The image formed by projector 58 is received directly on interior reception surface 54 of an arcuate panel 52. Typically, each projector 58 has a corresponding side arcuate panel 52 for receiving a projected image. Arcuate panels 52 are configured to receive the projected image onto reception surface 54 at a favorable angle to minimize spherical aberration difficulties. Thus, enclosed volume 50 defines an ovaloid surface having somewhat angled side vertical arcuate panels 52 for more normal incidence of the projected image on the panel surface.

External viewing surfaces 55 form more defined angles at intersecting surfaces than arcuate panels 14 forming spheroid 10 (FIG. 1). The external configuration of ovaloid 50, thus, is less suited to a continuous projected scene than spheroid 10, but better suited for discrete projections.

In yet another embodiment depicted in FIG. 3, buoyant body 70 is provided for transporting the reception system above large numbers of viewers. Panels 72 define an inflatable volume for obtaining a buoyant force. Thus, inflatable panels 72 define internal video reception surfaces, as hereinabove discussed in FIGS. 1 and 2. The inflatable volume defined by panels 72 may be generally spheroidal to maximize the buoyant force of the volume or may be ovaloid to permit projector mounting as discussed for FIG. 2. Video projectors 73 are arranged on support ring 76 mounted at a suitable elevation within the inflatable volume and directed toward internal portions of panels 72 for receiving the image. Again, a polyester material may be used, which is suitable for both image reception and for a buoyant body.

As shown in FIG. 3, at least some buoyant force is generated by introducing heated air within the inflatable volume defined by surface 72. Air may be heated by heat generated from video projectors 73. An alternate heat source 78 may also provided to assure maintenance of a buoyant force effective to "float" the assembly in the atmosphere. Alternate heat source 73 may conveniently be a hot gas generator used for hot air balloons.

Finally, gondola 80 is shown depending from the inflatable volume. Gondola 80 may conveniently be used to provide room for operators of the video equipment and as a work station.

The projection systems shown in FIGS. 1, 2 and 3 are supported within the respective volumes, with representative embodiments shown therein. A primary function of the support system in each case is to optimize the normality (i.e., perpendicularity) of incidence of the projected image on the reception surface. Thus, the system shown in FIG. 1, provides base plate 21 holding projectors 30 for vertical projection. Extension column 23 holds lenses system assemblies 31 at an elevation effective to receive the projected image and redirect the image toward reception surfaces (projection areas) 18. In FIGS. 2 and 3, base plate 57 and support 76, respectively, directly support the enclosed projectors 58 and 73 for direct projection of the images on the respective reception surfaces 54 and 72.

The image reception systems shown in FIGS. 1, 2, and 3 permit a video projection system to be compact while still presenting a large area projection for viewing. The concave arcuate image reception surfaces, such as surface 18 in FIG. 1 and surface 54 in FIG. 2, enable a wide angle of divergence to be obtained at the short focal lengths provided in the system. Distortion and aberration of the received image are reduced by the use of the concave reception surface. The projected image can, however, be viewed by large numbers of viewers who are located outside the inflated volume.

As many possible embodiments may be made of this invention without departing from the spirit or scope thereof, it is to be understood that all matters herein set forth in the accompanying drawings are to be interpreted as illustrative and not in any limiting sense.

I claim:

1. An image reception system for video projection apparatus comprising:
    a flexible material forming an inflatable volume enclosing said projection apparatus having a first plurality of arcuate surfaces,
    said first plurality of arcuate surfaces further including a second plurality of arcuate reception surfaces having an inflated interior surface contour and orientation for receiving from said projection apparatus a video image effective for viewing from a location external to said enclosed volume, and
    heater means for introducing heated air within said inflatable volume effective to establish a pressure differential across said flexible material effective to extend said first plurality of arcuate surface and inflate said inflatable volume,
    wherein said heater means includes fan means for directing air about said projection apparatus to remove heat therefrom.

2. An image reception system according to claim 1, further including:
    a base connected to said flexible material for securing said flexible material adjacent said heater means for establishing a pressure differential to inflate said volume and for storing said flexible material when said volume is not inflated.

3. An image reception system according to claim 1, wherein said heater means includes a gas flame generator.

4. An image reception system according to claim 2, wherein said base further includes telescoping means for erecting said flexible material for inflation and for supporting at least a portion of said projection apparatus within said inflatable volume.

5. An image reception system according to claim 3, wherein said inflatable volume, said projection apparatus and said gas flame generator cooperate to obtain a buoyancy effective to maintain a desired elevation of said image reception system.

* * * * *

UNITED STATES PATENT AND TRADEMARK OFFICE
CERTIFICATE OF CORRECTION

PATENT NO. : 4,597,633
DATED : July 1, 1986
INVENTOR(S) : Charles H. Fussell

It is certified that error appears in the above—identified patent and that said Letters Patent is hereby corrected as shown below:

Column 4, line 43, change "projection" to --protection--.

Signed and Sealed this

Thirtieth Day of September 1986

[SEAL]

Attest:

DONALD J. QUIGG

Attesting Officer     Commissioner of Patents and Trademarks